(12) United States Patent
Kennberg et al.

(10) Patent No.: US 8,935,259 B2
(45) Date of Patent: Jan. 13, 2015

(54) TEXT SUGGESTIONS FOR IMAGES

(75) Inventors: Aleksandr V. Kennberg, Waterloo (CA); Alexander Nicolaou, Waterloo (CA)

(73) Assignee: Google Inc, Mountain View, CA (US)

(*) Notice: Subject to any disclaimer, the term of this patent is extended or adjusted under 35 U.S.C. 154(b) by 0 days.

(21) Appl. No.: 13/164,692

(22) Filed: Jun. 20, 2011

(65) Prior Publication Data

US 2012/0323930 A1    Dec. 20, 2012

(51) Int. Cl.
*G06F 7/00*     (2006.01)
*G06F 17/30*    (2006.01)

(52) U.S. Cl.
CPC ............................. *G06F 17/30268* (2013.01)
USPC ........... 707/748; 707/758; 382/118; 382/154; 382/180; 382/181

(58) Field of Classification Search
USPC ........... 707/705, 722, 748, 758, 999.1, 999.3; 382/118, 154, 180, 181
See application file for complete search history.

(56) References Cited

U.S. PATENT DOCUMENTS

| 8,073,850 | B1* | 12/2011 | Hubbard et al. | 707/736 |
| 2009/0074261 | A1* | 3/2009 | Haupt et al. | 382/118 |
| 2010/0103277 | A1* | 4/2010 | Leebow | 348/222.1 |
| 2011/0320560 | A1* | 12/2011 | Bennett et al. | 709/217 |
| 2012/0086792 | A1* | 4/2012 | Akbarzadeh et al. | 348/77 |

OTHER PUBLICATIONS

International Search Report and Written Opinion of International Searching Authority for related application PCT/US2012/42226 dated Nov. 28, 2012.

* cited by examiner

*Primary Examiner* — Hares Jami (57) ABSTRACT

Methods, systems, and apparatus, including computer programs encoded on a computer storage medium, for receiving image data corresponding to an image, processing the image data to identify one or more features within the image, generating one or more keywords based on each of the one or more features, transmitting the one or more keywords to a computing device for displaying a list of the one or more keywords to a user, receiving text, the text comprising at least one keyword of the one or more keywords, that at least one keyword having been selected by the user from the list, and transmitting the image and the text for display, the text being associated with the image.

17 Claims, 5 Drawing Sheets

TEXT SUGGESTIONS FOR IMAGES

TECHNICAL FIELD

This specification generally relates to suggesting text for images.

BACKGROUND

People take photographs (photos) to document events and to keep memories. People often share the photos with friends and family. In recent years, digital photography has become more mainstream. Using digital photography, a photographer can capture a photograph and store the photograph as a digital file. The digital file can be stored to computer-readable memory, can be copied and can be electronically distributed. The Internet has made the sharing of photos much easier. People can email photos to friends, or post them on websites for others to view. Social networking websites are also used to share photos with friends and acquaintances. People can also label photos with captions or keywords.

SUMMARY

In general, innovative aspects of the subject matter described in this disclosure may be embodied in methods that include the actions of receiving image data corresponding to an image, processing the image data to identify one or more features within the image, generating one or more keywords based on each of the one or more features, transmitting the one or more keywords to a computing device for displaying a list of the one or more keywords to a user, receiving text, the text including at least one keyword of the one or more keywords, that at least one keyword having been selected by the user from the list, and transmitting the image and the text for display, the text being associated with the image.

These and other implementations may each optionally include one or more of the following features. For instance, the image data further includes metadata; the metadata includes geo-location data corresponding to a geographic location where the image was generated; the metadata includes time data corresponding to a time when the image was generated; generating the one or more keywords is further based on the metadata; the one or more features include a landmark; the one or more features include people; the people include users of a social networking service; the one or more features are objects; a certainty score is generated for each of the one or more features; the one or more features are ranked based on the certainty score of each of the one or more features; a threshold number of the one or more features is selected based on the ranking; and one or more features with a certainty score that meets a threshold certainty score are included in the ranking.

Other implementations of this aspect include corresponding systems, apparatus, and computer programs, configured to perform the actions of the methods, encoded on computer storage devices.

Implementations of the present disclosure provide one or more of the following example advantages: enhancing the use of computing devices, such as mobile computing devices, by reducing an amount of typing the user performs to provide textual posts, providing richer social posts through the addition of meaningful content to posts, suggested keywords used within a post can provide improved context for other systems (e.g., post matching, searching), and/or feedback for a recognition engine (e.g., if the user chooses suggested keywords for a post and adds further own words, the added words can provide clues for the recognition engine to rank other keywords with higher certainty in the future).

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to suggesting keywords for captions or tags for images. A user can generate digital images (e.g., using a digital camera) that can each be electronically stored in an image file. The image files can be uploaded to one or more servers for publication of the images to a viewing audience. For example, the user can upload the image files to a social networking website for publication to other users of the social networking website. As another example, the user can upload the image files to a photo-sharing website for publication to other users of the photo-sharing website. Data corresponding to an image can be processed to determine features that may be seen within the image. Example features can include landmarks identified in the image, objects identified in the image, and people recognized in the image. The system can also use metadata of the underlying image file, such as timestamp data of when the image was generated and geo-location data indicating where the image was generated. Geo-location can include global positioning system (GPS) data, Wifi location data and/or cell tower location data.

In some implementations, the keywords can be generated based on the features determined from each image and/or the metadata corresponding to the image. For example, keywords can include the landmarks, objects, or people recognized in the image. The keywords can also include times of day and/or locations based on the metadata or other data from the image file. The keywords can be suggested to the user to be used as keywords, or tags, to be associated with the image when it is published. In some implementations, the keywords or the features determined can be assigned a score, such as a certainty score, corresponding to a confidence measure of the extracted feature. A threshold number of keywords or a number of keywords with a threshold score can be suggested to the user. For example, the top five likely keywords can be provided to the user as suggested keywords.

By way of non-limiting example, a user can take a picture of the Statue of Liberty at noon using a digital camera (e.g., a stand-alone digital camera, a digital camera integrated into a mobile computing device). The image data underlying the image can be analyzed to determine the Statue of Liberty as a recognized landmark. A timestamp of the image can be provided in the image data and can indicate that the photo was taken at noon. The image data can also include geo-location data indicating that the photo was taken in New York City and/or a particular location within New York City (e.g., Liberty Island). Alternatively or additionally, the Statue of Liberty can be used to determine that the image was generated in New York City. Example keywords generated from the features can include "Statue of Liberty," "lunch time," "New York" and "New York City". Keywords can include phrases, such as the three example keywords. The keyword "lunch time" can be generated based on the timestamp data indicating that the image was generated at noon. In some implementations, additional information (e.g., facts) can be suggested to the user, which the user can include in a post. Continuing with the example above, example facts can include historical and/or interesting facts about the Statue of Liberty (e.g., year built, anniversary dates, height, amount of material used in construction, etc.).

The user can select from the suggested keywords to tag the image or provide a caption for the image for publication, for example, on the social networking site. For example, the user can take and upload an image from a mobile computing device, such as a smart phone. By receiving suggested keywords, the user does not have to type out keywords to tag the image. The selected keywords can be included in a textbox, so that the user can add additional text or edit the suggested keywords to tag the image and/or add a caption to the image. In some implementations, suggested facts can be selected by the user to add to the post.

In some implementations, for situations in which the systems discussed herein collect personal information about users, the users may be provided with an opportunity to opt in/out of programs or features that may collect personal information (e.g., information about a user's preferences, information relating to locations the user may have been to take photos, information relating to people recognized in photos, or a user's contributions to social content providers). In addition, in some implementations, certain data may be anonymized in one or more ways before it is stored or used, so that personally identifiable information is removed. For example, a user's identity may be anonymized so that identified user preferences or user interactions are generalized (for example, generalized based on user demographics) rather than associated with a particular user.

Figure 1:
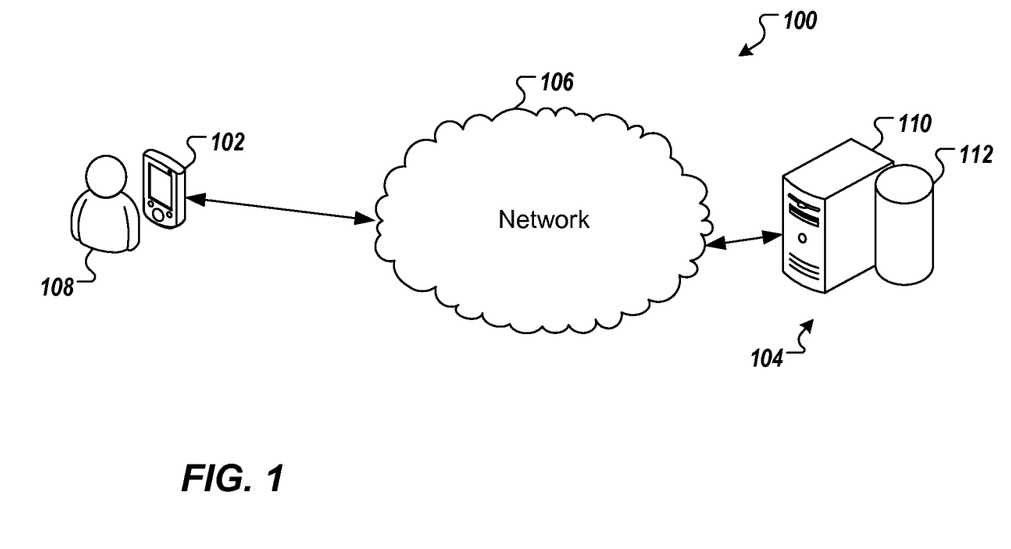
FIG. 1 depicts an example system that can execute implementations of the present disclosure.

FIG. 1 depicts an example system 100 that can execute implementations of the present disclosure. The system 100 includes a computing device 102 that can communicate with one or more server systems 104 over a network 106. The computing device 102 includes an associated user 108. The network 106 can include a large computer network, such as a local area network (LAN), wide area network (WAN), the Internet, a cellular network, or a combination thereof connecting any number of mobile computing devices, fixed computing devices, and server systems. The server system 104 includes a computing device 110 and a machine-readable repository, or database 112. It is appreciated that, although a server system 104 is depicted, the server system can represent one or more server systems.

In the example system 100, the computing device 102 is illustrated as a mobile computing device. It is appreciated, however, that the computing device 102 can include any appropriate type of computing device such as a tablet computing device, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

The computing device 102 enables the user 108 to take a photograph (photo) to generate a digital image or access and view an existing image. The image can be stored as an image file on the computing device 102 or accessed through the network 106 from a different computing device. The computing device 102 enables the user 108 to add descriptive words, or tags, to apply to the image. In some implementations, the computing device 102 can communicate over the network 106 to provide the image file to the server system 104. The server system 104 can analyze image data of the image file to extract features that may be viewable in the image. The features can be used to provide suggested keywords that can be used as tags and/or a caption for the image. Other implementations are possible. In alternative implementations, the photograph can be generated using a separate device (e.g., a standalone digital camera, a digital scanner) and uploaded to the server system 104 using the computing device 102, for example.

Figure 2A:
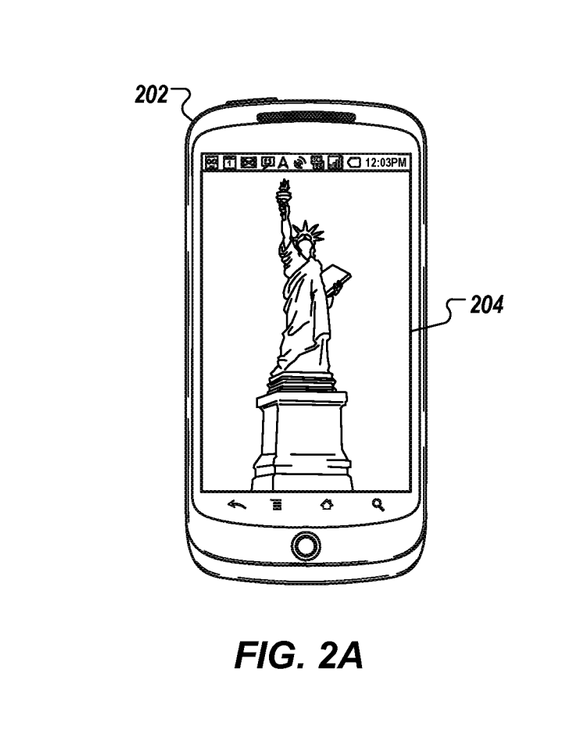
FIGS. 2A-2C depicts example screenshots in accordance with implementations of the present disclosure.
Figure 2B:
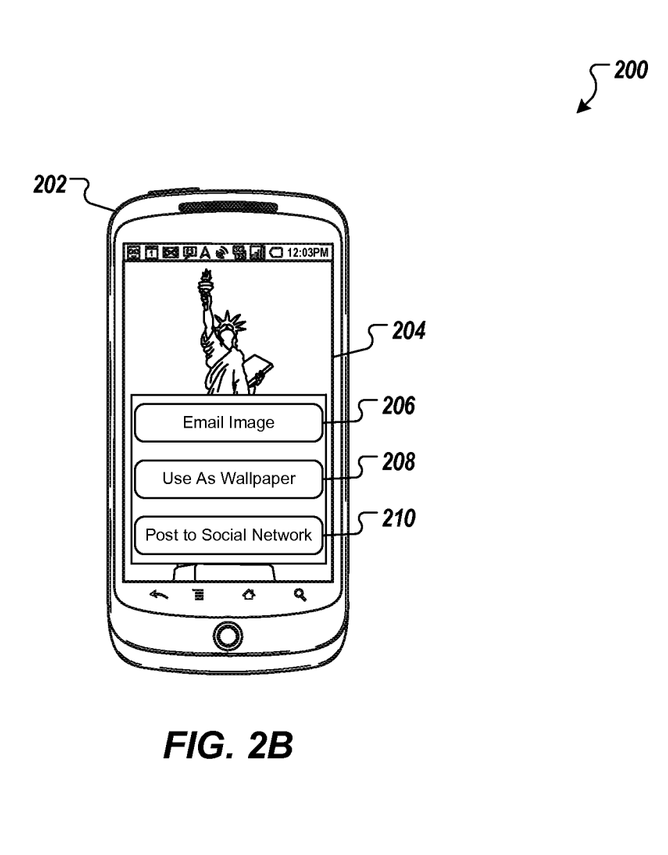
Figure 2C:
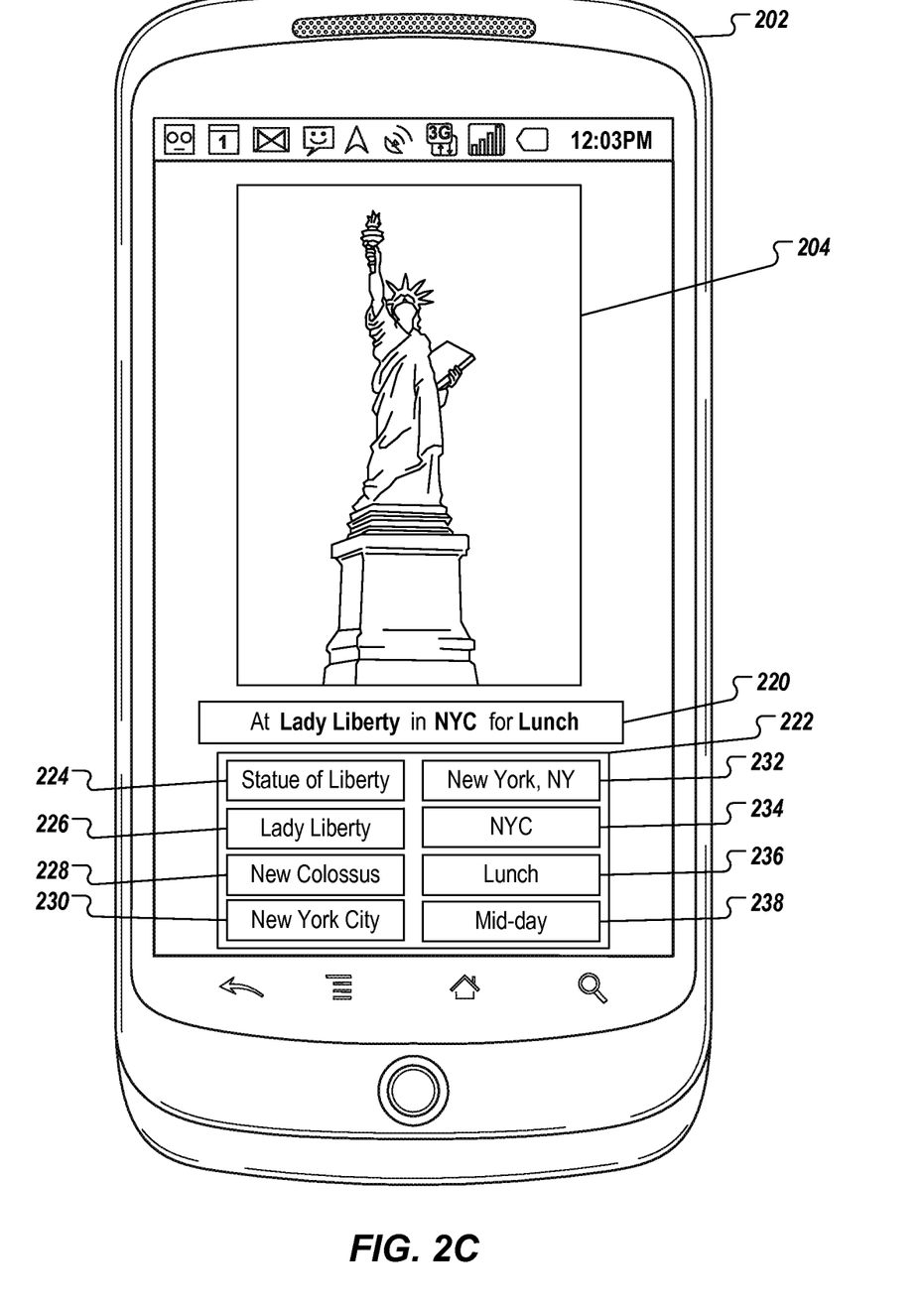

FIGS. 2A-2C depict example screenshots in accordance with implementations of the present disclosure. For purposes of illustration, the following discussion includes reference to the Statue of Liberty in New York City as an example feature within a digital image. It is appreciated that implementations of the present disclosure are applicable to any features that may be depicted in a digital image.

Referring to FIG. 2A, a user can use a mobile computing device 202 to capture an image 204 of the Statue of Liberty. For example, the mobile computing device 202 can include a camera, with which the user can capture the image 204. Alternatively or additionally, the image 204 can be accessed by or transferred to the mobile computing device 202 from digital memory within the mobile computing device 202 and/ or from another computing device. For example, the mobile computing device 202 can access the image 204 from a social networking site, the image 204 can be sent to the user from another user, or the image 204 can be transferred to the mobile computing device 202 from an image collection stored on a separate computing device. While a mobile computing device is depicted in FIGS. 2A-2C, implementations of the present disclosure can be achieved on any appropriate computing device, including laptops and desktop computers.

The user can bring up a menu of options provided as iconic buttons 206, 208, 210 as shown in FIG. 2B. For example, the menu can be accessed by tapping on the screen of the mobile computing device 202, on the image 204 or on a physical button of the mobile computing device 202. The buttons 206, 208, 210 can provide the user options to apply to the image 204. For example, an "Email Image" button 206 can enable the user to email the image 204. A "Use as Wallpaper" button 208 can set the image 204 as a wallpaper or background image of the mobile computing device 202. A "Post to Social Network" button 210 can enable the user to post the image 204 to a social networking site. The menu can include more buttons for additional options to apply to the image 204, or less buttons. In some implementations, the user can be working directly in a social networking application executed on the mobile computing device, can take a picture using functionality provided in the social networking application, and can automatically be prompted to share the picture without going through the example menu options discussed above.

If the user selects the "Post to Social Network" button 210, the mobile computing device 202 can upload the image 204 to a social networking site by transmitting the image file to a server system operated by the social networking site. The server system can receive the image file and process the image data to extract features that may be viewable in the image 204. For example, the image data of the image 204 can be analyzed to determine that the Statue of Liberty is viewable within the image 204. The image data can also include metadata, such as a timestamp. For example, the image 204 could have been generated at 12:03 PM as shown on the mobile computing device 202. The metadata can also include geo-location data, for example, indicating a location or approximate location of where the image 204 was generated (e.g., New York City, Liberty Island). Other features can include objects, such as buildings, cars, or animals. Features can also include people. In some implementations, the image data can be analyzed to determine that a person is present in the image. If it is determined that a person is present in the image, the image can be further analyzed to determine an identity of the person. For example, an image can include a friend of the user, the friend being socially connected to the user through a social networking service. In some implementations, the friend can grant permission to be identified in images submitted by people that the friend is connected to in the social networking service.

Any appropriate feature extraction engine can be used to extract features from the image. For example, a feature extraction engine directed to recognizing famous works of art can be used to extract famous works of art that are viewable in images. As another example, a feature extraction engine directed to recognizing landmarks can be used to extract landmarks that are viewable in images. As another example, a feature extraction engine directed to recognizing the presence of a person that is viewable within an image and the identity of the person can be used. In some implementations, images can be analyzed using multiple feature extraction engines. In some implementations, images can be analyzed using a single feature extraction engine. Each feature extraction engine can be provided as a computer program product that is executable on a computing device. In some implementations, the feature extraction engine can be executed using one or more server systems (e.g., the server system 104 of FIG. 1), and/or on a computing device (e.g., the computing device 102 of FIG. 1).

Continuing with the example above, the server system can generate keywords related to the features extracted from the image. For example, keywords can include "Statue of Liberty," "Lady Liberty," and "New Colossus," generated from the recognized landmark in the photo 204. The keywords can also include "New York, N.Y.," "NYC," and "New York City." The location keywords can be generated from geo-location metadata, and/or from recognizing that the Statue of Liberty is located in New York City on Liberty Island. The keywords can also include "Lunch" and "Mid-day," generated from the timestamp metadata. These and other keywords can be generated using the features extracted from the photo 204.

In some examples, keywords can include one or more keywords that are pre-determined as corresponding to an extracted feature. For example, the extracted feature can be identified as the Statue of Liberty. An index of keywords associated with the Statue of Liberty can be accessed to provide one or more keywords (e.g., Lady Liberty, New Colossus, Liberty Island).

In some implementations, keywords can be generated based on a search query that includes the extracted feature(s). In some examples, a search query can be generated and can include one or more search terms that correspond to one or more extracted features. The search query can be processed using conventional searching techniques to generate one or more search results. The search results can be processed to extract one or more keywords. Continuing with the example, the extracted feature can include "Statue of Liberty." "Statue of Liberty" can be provided as a search query and can be input to a search engine. One or more search results can be generated and can include information (e.g., content provided in one or more web pages) corresponding to the Statue of Liberty. The information can be processed to extract one or more keywords.

The keywords or a subset of the keywords can be provided to the mobile computing device 202. The mobile computing device 202 can display the keywords suggested by the server system. In FIG. 2C, the mobile computing device 202 receives the suggested keywords from the server system and displays the suggested keywords in a box 222. The mobile computing device 202 can provide a text box 220 where the user can type in a caption for the image 204 to post with the image 204 when the image 204 is published. The user can select among the suggested keywords 224-238 to include in the caption. For example, the user can type the word "At" into the text box 220 (e.g., using a touch-screen keyboard not shown in FIG. 2C), and can select the "Lady Liberty" keyword 226. The user can continue to type in the text box 220 the word "in," followed by selecting the "NYC" keyword 234, type the word "for" in the text box 220, and select the "Lunch" keyword 236. Thus, the caption would read "At Lady Liberty in NYC for Lunch."

By providing the suggested keywords, the user can generate a caption for the picture with fewer clicks on the mobile computing device 202. For example, typing the full example caption (At Lady Liberty in NYC for Lunch) could require 32 clicks, for example, for all the characters and spaces. By clicking on the suggested keywords instead of typing out the selected keywords, the caption can be generated using 10 clicks instead of 32. Consequently, adding captions to images is made easier and quicker through implementations of the present disclosure, and users may be more inclined to add captions and tags to shared images. Further, the suggested keywords may include keywords that the user may not have used or thought of, and or that are associated with aspects of the image that the user may not have noticed or remembered. As discussed above, suggested facts can be presented to the user, which facts can be selected for inclusion as part of the post.

In some implementations, the image can include a plurality of features that may be extracted from the image. Each feature can include a score associated therewith. In some implementations, the score can include a certainty score, corresponding to how confident the system (e.g., the feature extraction engine) is that the feature has been correctly identified in the image. For example, and continuing with the example of FIGS. 2A-2C, the system may be fairly certain that the landmark in the image 204 is the Statue of Liberty. Consequently, the "Statue of Liberty" feature and keywords generated based on the feature can be given a high certainty score, such as 0.9 on a scale of 0 to 1, for example, if the system is 90% confident that the landmark in the image 204 is the Statue of Liberty. Other features may also be extracted from the image, with each feature including an associated certainty score. In some implementations, the features can be ranked in order of certainty score and a subset of features can be selected for keyword suggestion. For example, the features with the highest X certainty scores (e.g., X=3, 4 or 5) can be selected, and keywords can be generated based on the selected features.

As a non-limiting example, an image can be analyzed and the following features with the associated certainty scores can be extracted:

| Feature | Certainty Score |
|---------|-----------------|
| A | 0.50 |
| B | 0.93 |
| C | 0.85 |
| D | 0.61 |
| E | 0.63 |

Using this example, the features can be ordered based on certainty score from highest to lowest to provide the following ranked order:

Feature B
Feature C
Feature E
Feature D
Feature A

The top three, for example, features can be selected for keyword suggestion. Continuing with the above example, Feature B, Feature C and Feature E would be selected and can be processed to generate suggested keywords.

In some implementations, a threshold certainty score can be used to further limit the features that are selected for keyword suggestion. In this manner, even though a particular feature may be in the list of features having the highest X certainty scores (e.g., X=3, 4 or 5), the particular feature may still not be selected for keyword suggestion if the associated certainty score is less than the threshold certainty score. Continuing with the example above, and using a particular threshold certainty score, Feature E, Feature D and Feature A may include certainty scores that are less than the particular threshold certainty score. Consequently, Feature B and Feature C would be the only features that are selected for keyword suggestion.

In some implementations, and for each selected feature, one or more keywords can be identified. The number of keywords provided for each feature can be limited to a threshold number of keywords. In some implementations, each identified keyword can include an associated popularity score that can reflect how common and/or recognizable a keyword may be. In some implementations, the keywords can be ranked in order of popularity score and a subset of keywords can be selected as suggested keywords that are to be presented to the user. For example, the keywords with the highest X popularity scores (e.g., X=3, 4 or 5) can be selected as suggested keywords. In some implementations, other metrics can be used to rank the keywords. In some examples, a landmark recognized within an image can be weighted higher than an object (e.g., a car) and/or time of day. In this manner, more suggested keywords corresponding to an identified landmark may be provided than are provided for the object and/or the time of day, for example.

In some implementations, no keywords can be suggested if features cannot be extracted or keywords cannot be generated with sufficient certainty. In such instances, a simple message (e.g., "No Keyword Suggestions") can be displayed to the user.

Figure 3:
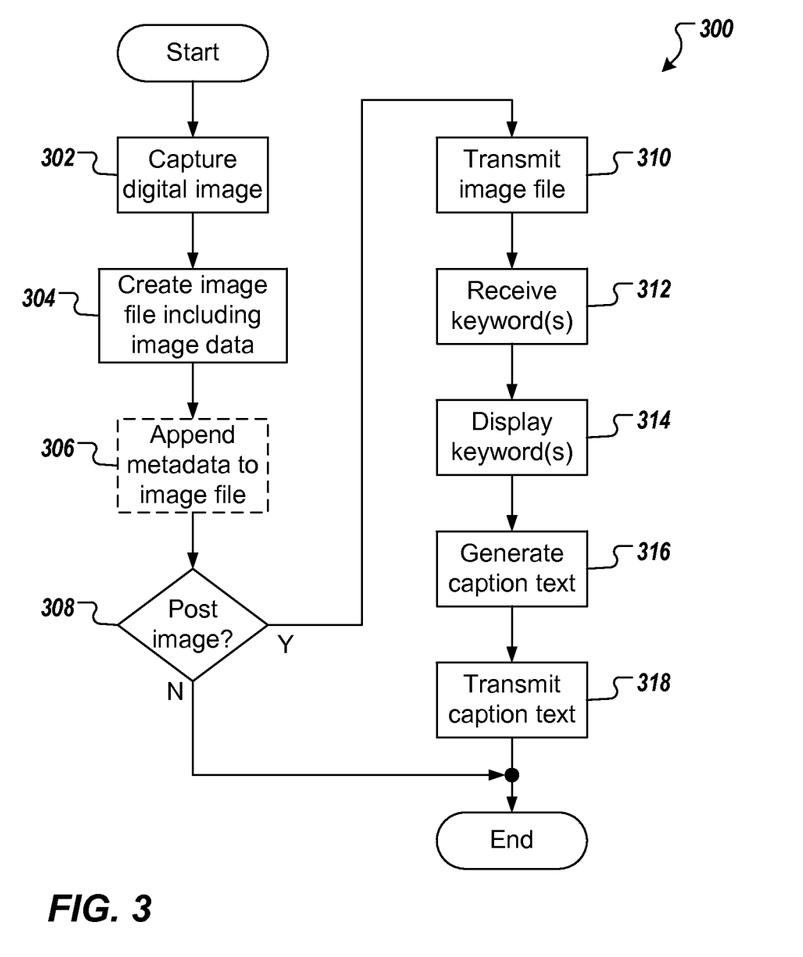
FIG. 3 is a flowchart illustrating an example process for generating social post suggestions based on information extracted from an image.

FIG. 3 is a flowchart of an example process 300 for generating social post suggestions based on information extracted from an image. In some implementations, actions represented in the example process 300 may be performed by a computing system (e.g., the computing device 102 of FIG. 1).

A digital image is captured (302). The computing device 102 of FIG. 1 can be used to take a photo, or a digital image, for example. The digital image can include features such as landmarks, objects, and/or people that are viewable within the image. An image file including image data is created (304).

The captured digital image can be stored on the computing device 102 as an image file including image data, such that the image can be presented on a screen of the computing device 102. As one option, metadata can be appended to the image file (306). The metadata can include timestamp and geolocation data respectively corresponding to when and where the image was captured.

It can be determined whether to post the image (308). For example, user input can be received and can indicate a command from the user to post the image (e.g., a user click on the iconic button 210 of FIG. 2B). The image can be posted, for example, on a social networking site. The user can decide not to post the image, in which case the process ends. The user can also choose to post the image, in which case the image file is transmitted (310). The image file can be transmitted to a server system for extraction of features and/or generation of keywords.

Keywords are received (312). The keywords can include descriptions of the features of the image, such as landmarks, objects, people, times of day, and locations. The keywords are displayed (314) to the user. The user can use the keywords to generate caption text (316). The caption text can include selected keywords and other text input by the user. The caption text is transmitted (318). The caption text can be associated with the image and published on a social networking site for the user and other people, such as the user's connections, to see.

It is appreciated that the process 300 of FIG. 3 is an example process and implementations of the present disclosure can be realized using other processes. In some examples, an image can be captured and the image can be uploaded to a backend server system as a background function. The user can type in post text and submit the post. In some examples, the image is already uploaded to the backend server and the post goes through almost instantly. In some examples, the user may cancel posting the image and, in response, the image is deleted from the backend server system and the upload is canceled. In some examples, because the image is uploaded in the background, the list of suggested keywords can be received back from the backend server system, while user is composing the post and before the user submits the posts. In some examples, if the suggested keywords have not been provided to the user before the user submits the post, the post goes through as normal (i.e., the user is not blocked or hindered in posting).

Figure 4:
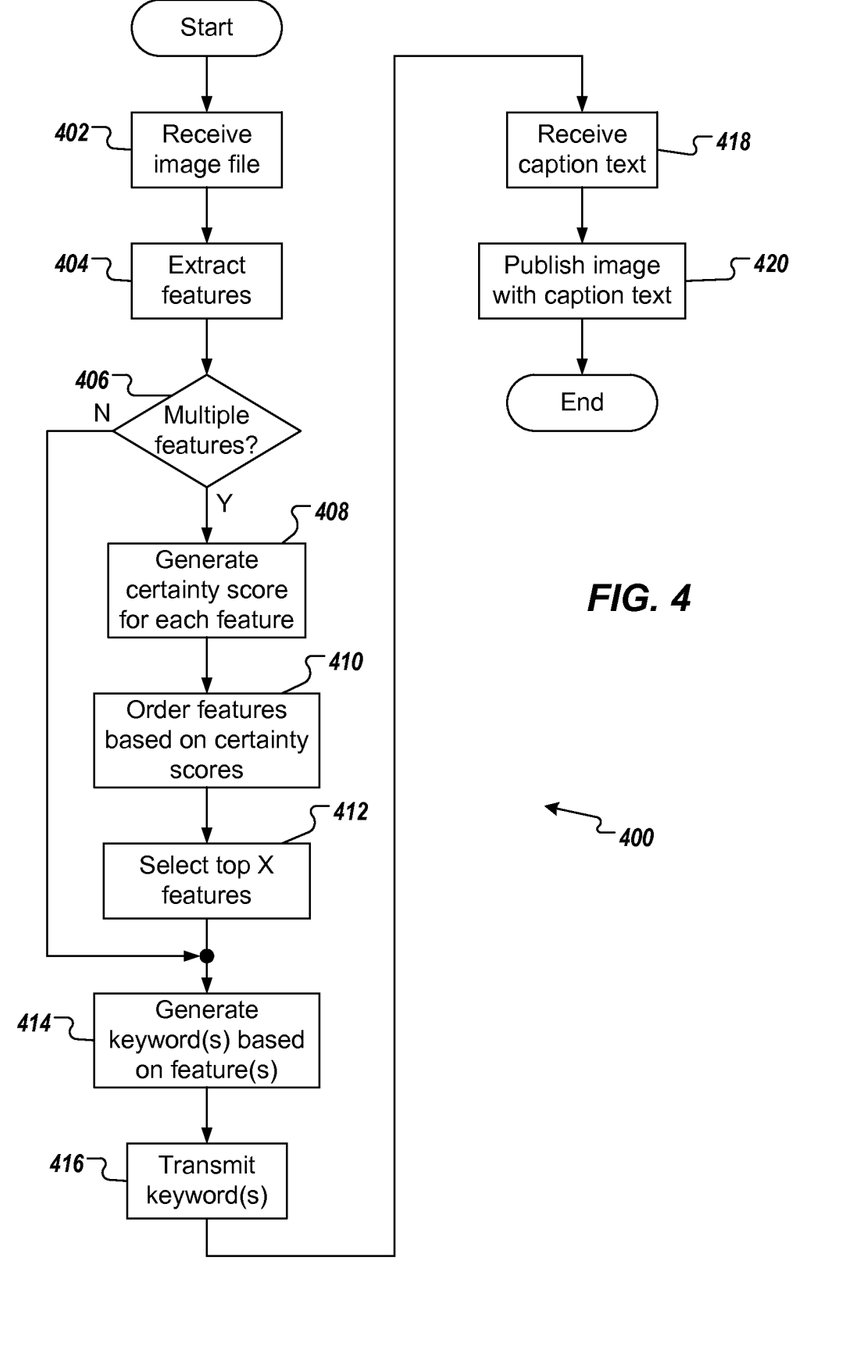
FIG. 4 is a flowchart illustrating an example process for generating social post suggestions based on information extracted from an image.

FIG. 4 is a flowchart of an example process 400 for generating social post suggestions based on information extracted from an image. In some implementations, actions represented in the example process 400 may be performed by one or more computing system (e.g., the computing device 102 and/or the server system 104 of FIG. 1).

An image file is received (402). The image file can be received by the server system 104 of FIG. 1 from the computing device 102, for example. Features are extracted (404) from the image file. Example features can include objects, landmarks, logos, faces in the image, as well as time of day and location the image was captured.

The computing system 110 determines whether multiple features are extracted (406). If only one feature is extracted, the process continues to keyword generation. In some implementations, a certainty score of the extracted feature can be processed to ensure a threshold level of certainty of the extracted feature. If multiple features are extracted, a certainty score is generated for each feature (408). The certainty score can correspond to a confidence that the feature extracted from the image is, in fact, in the image.

The features are ordered based on certainty scores (410). In some implementations, only features with a minimum threshold certainty score are included in the ordering. The top X features are selected (412). X can be any appropriate number of features. For example, the user can set how many features are selected.

Keywords are generated based on the features (414). Each feature can be the basis for one or more keywords. The number of keywords generated for each feature can vary, for example, depending on how many features were extracted from the image. As discussed herein, each keyword can include an associated score, which can also vary.

The keywords are transmitted (416) to the user. The user can select among the keywords to generate a caption for the image. The user can transmit the caption text, and the caption text can be received (418). The image is published with the caption text (420), for example, on a profile associated with the user on the social networking site.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A system comprising:
   a computing device; and
   a computer-readable medium coupled to the computing device and having instructions stored thereon which, when executed by the computing device, cause the computing device to perform operations comprising:
     receiving image data corresponding to an image;
     processing the image data to identify different features within the image, wherein a certainty score is generated for each of the different features, and the different features are ranked based on the certainty score of each of the different features, and a threshold number of features is selected based on the ranking;
     generating one or more keywords based on geo-location data and each of the threshold number of selected features, wherein a score is generated for each keyword that corresponds to the certainty score generated for each of the different features;
     transmitting the one or more keywords to a remote computing device for displaying a list of the one or more keywords to a user;
     providing a text box to the user;
     receiving text from the user in the text box, the text comprising one or more user-input characters and at least one keyword of the one or more keywords, the at least one keyword having been selected by the user from the list; and
     transmitting the image and the text for display, the text being associated with the image.

2. The system of claim 1, wherein the image data further comprises metadata.

3. The system of claim 1, wherein geo-location data corresponds to a geographic location where the image was generated.

4. The system of claim 2, wherein the metadata comprises time data corresponding to a time when the image was generated.

5. The system of claim 2, wherein generating the one or more keywords is further based on the metadata.

6. The system of claim 1, wherein the different features comprise a landmark.

7. The system of claim 1, wherein the different features comprise people.

8. The system of claim 7, wherein the people comprise users of a social networking service.

9. The system of claim 1, wherein the different features are objects.

10. The system of claim 1, wherein the different features with a certainty score that meets a threshold certainty score are included in the ranking.

11. The system of claim 1, wherein the score generated for each keyword corresponds to the certainty score generated for each of the different features and a popularity score.

12. The system of claim 1, wherein the one or more keywords are generated using a search query.

13. A nontransitory computer storage medium encoded with a computer program, the program comprising instructions that when executed by one or more computers cause the one or more computers to perform operations comprising:
    receiving image data corresponding to an image;
    processing the image data to identify different features within the image, wherein a certainty score is generated for each of the different features, and the different features are ranked based on the certainty score of each of the different features, and a threshold number of features is selected based on the ranking;
    generating one or more keywords based on geo-location data and each of the threshold number of selected features, wherein a score is generated for each keyword that corresponds to the certainty score generated for each of the different features;
    transmitting the one or more keywords to a computing device for displaying a list of the one or more keywords to a user;
    providing a text box to the user;
    receiving text from the user, the text comprising one or more user-input characters and at least one keyword of the one or more keywords, the at least one keyword having been selected by the user from the list; and
    transmitting the image and the text for display, the text being associated with the image.

14. The medium of claim 13, wherein the image data further comprises metadata.

15. The medium of claim 14, wherein the metadata comprises time data corresponding to a time when the image was generated.

16. The medium of claim 14, wherein generating the one or more keywords is further based on the metadata.

17. A computer-implemented method comprising:
    receiving image data corresponding to an image;
    processing the image data to identify different features within the image, wherein a certainty score is generated for each of the different features, and the different features are ranked based on the certainty score of each of the different features, and a threshold number of features is selected based on the ranking;
    generating one or more keywords based on geo-location data and each of the threshold number of selected features, wherein a score is generated for each keyword that corresponds to the certainty score generated for each of the one or more features;

transmitting the one or more keywords to a computing device for displaying a list of the one or more keywords to a user;
providing a text box to the user;
receiving text from the user, the text comprising one or more user-input characters and at least one keyword of the one or more keywords, the at least one keyword having been selected by the user from the list; and
transmitting the image and the text for display, the text being associated with the image.

* * * * *